US009401942B2

(12) United States Patent
Rey et al.

(10) Patent No.: US 9,401,942 B2
(45) Date of Patent: Jul. 26, 2016

(54) ESTABLISHMENT OF A CONFERENCE WITH A COMMUNICATION FLOW MIXING POLICY

(75) Inventors: Jean-Francois Rey, Brest (FR); Jacques Litteaut, Marley le Roy (FR); Stéphane Coulon, Colombes (FR)

(73) Assignee: Alcatel Lucent, Boulogne-Billancourt (FR)

( * ) Notice: Subject to any disclaimer, the term of this patent is extended or adjusted under 35 U.S.C. 154(b) by 123 days.

(21) Appl. No.: 12/933,758

(22) PCT Filed: Mar. 23, 2009

(86) PCT No.: PCT/FR2009/050492
§ 371 (c)(1),
(2), (4) Date: Dec. 13, 2010

(87) PCT Pub. No.: WO2009/125116
PCT Pub. Date: Oct. 15, 2009

(65) Prior Publication Data
US 2011/0093547 A1    Apr. 21, 2011

(30) Foreign Application Priority Data
Mar. 21, 2008  (FR) ..................................... 08 51835

(51) Int. Cl.
G06F 15/16 (2006.01)
H04L 29/06 (2006.01)
H04L 12/18 (2006.01)
H04L 29/08 (2006.01)
H04L 12/58 (2006.01)

(52) U.S. Cl.
CPC ........ *H04L 65/4038* (2013.01); *H04L 12/1822* (2013.01); *H04L 67/025* (2013.01); *H04L 67/306* (2013.01); *H04L 67/34* (2013.01); *H04L 12/5855* (2013.01); *H04L 65/1006* (2013.01)

(58) Field of Classification Search
None
See application file for complete search history.

(56) References Cited

U.S. PATENT DOCUMENTS 8,073,906 B2 *  12/2011  Sekaran et al. ............... 709/204
2008/0160976 A1 *  7/2008  Virolainen ............ H04M 3/568
                                                        455/416

FOREIGN PATENT DOCUMENTS

CN        1997069      *    7/2007
CN        1997069  A        7/2007

OTHER PUBLICATIONS

Johnston et al, Session Initiation Protocol (SIP) Call Control—Conferencing for User Agent, RRC 4579, Aug. 2006, Microsoft Corporation, IETF Standard, All Pages.*

(Continued)

*Primary Examiner* — Mohamed Wasel
*Assistant Examiner* — Tsung Wu
(74) *Attorney, Agent, or Firm* — Fay Sharpe, LLP

(57) ABSTRACT

To access a communication managed by a host communicating entity between participant communicating entities including the host communicating entity via a packet network (RP), a third-party communicating entity transmits a message (MI) to the host communicating entity, which message comprises at least one parameter (PM) associated with an identifier of at least one participant communicating entity. The third-party entity's access to a peer-to-peer communication established between the host entity and a participant entity may create a conference between the three entities. The third-party entity's access to a conference communication may cause a participant to be added to the existing conference. The host communicating entity applies a restrictive policy on mixing communication flows exchanged between the communicating entities as a function of the parameter and the identifier of the participant communicating entity associated with the parameter.

11 Claims, 2 Drawing Sheets

(56) References Cited

OTHER PUBLICATIONS

Figure 1:
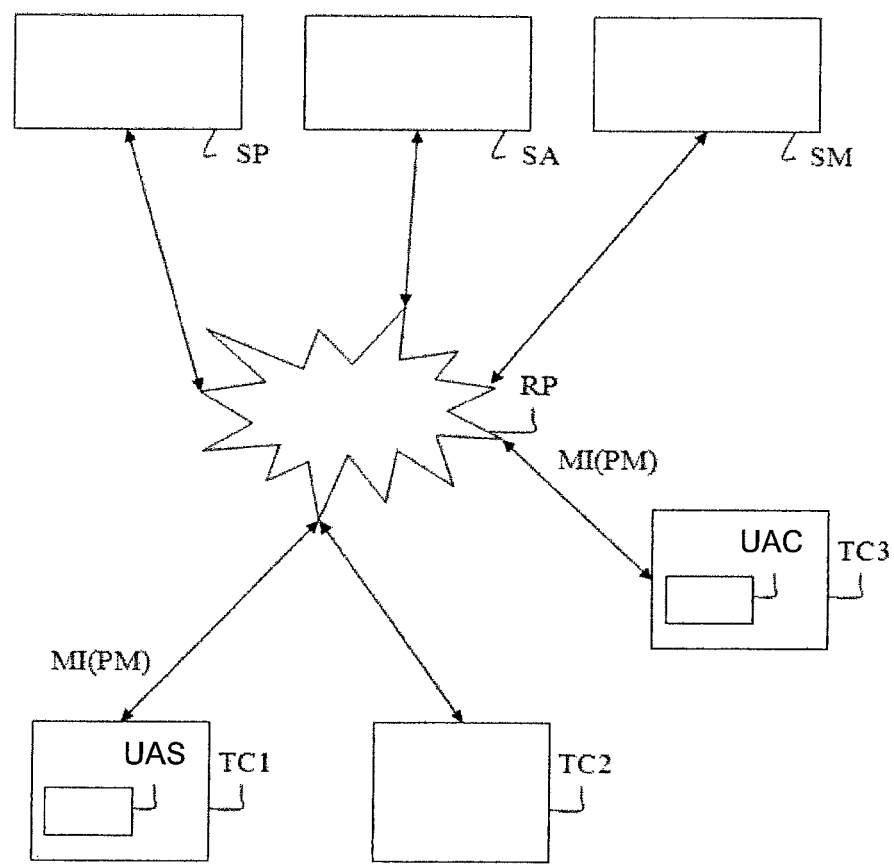

Mahy et al, The Session Initation Protocol (SIP) Join Header, RFC 3911, Oct. 2004, IETF Standard, All Pages.*
Ott, SIP Conferencing, May 2001, SIP Congress 2001, All Pages.*
Johnston et al, Session Initiation Protocol (SIP) Call Control—Conferencing for User Agent, RFC 4579, Aug. 2006, Microsoft Corporation, IETF Standard, All Pages.*
Johnston Avaya O Levin Microsoft Corporation A: "Session Initiation Protocol (SIP) Call Control—Conference for User Agents; rfc4579.txt" IETF Standard, Internet Engineering Task Force, XP015055014, Aug. 1, 2006.
Mahy Airespace D Petrie Pingtel R: "The Session Initiation Protocol (SIP) Join Header; rfc3911.txt" IETF Standard, Internet Engineering Task Force, XP015009684, Oct. 1, 2004.
International Search Report for PCT/FR2009/050492.

* cited by examiner

ESTABLISHMENT OF A CONFERENCE WITH A COMMUNICATION FLOW MIXING POLICY

The present invention concerns an establishment of a multimedia conference between at least three communicating entities within a packet network. More particularly, the invention concerns the assignment of a communicating entity such as a terminal or a server to an already established communication between at least two other communicating entities.

Currently, a terminal may join an already established communication between multiple other terminals, in order to expand the conference, during which each terminal transmits data to each of the other terminals and receives data from each of the other terminals. The multimedia communication may consist of an exchange of data such as flows of video, audio, or instant messages, which are established via the SIP protocol.

The document RFC 3911 describes the use of a "Join" header within an "INVITE" message so that a third-party terminal may join an already-established multimedia communication between at least two terminals through the use of the SIP ("Session Initiation Protocol") signaling protocol. The "Join" header contains information about the SIP communication ("dialog" in SIP terminology) already established between the two terminals.

This mechanism creates a new conference between at least the three terminals using a new address specific to the conference. For example, a host terminal locally mixes all of the multimedia communication flows, generates and transmits a new address specific to the conference to the other terminals so that these terminals know that a conference is taking place and that they may optionally request information about the conference from the host terminal, using the new address as a reference. According to another example, the host terminal transmits an INVITE message to a media server and informs the other terminals of the server's address so that these terminals can connect to the media server, which mixes all of the multimedia communication flows from the conference established between the three terminals.

This mechanism has the drawback of creating a new conference which does not give the host terminal the option of restrictively mixing the multimedia communication flows transmitted and/or received by the third-party terminal. The third-party terminal cannot partially join a multimedia communication already established between the host terminal and at least one other terminal. "Partially" refers to the option of restricting exchanges of communication flows between the third-party terminal and at least one of the terminals already in communication, such as in the event of unilateral communication between the third-party terminal and another terminal already in communication. A multimedia communication flow corresponds to a multimedia data transmission, such as video or audio data, between two terminals.

An object of the invention is to remedy the aforementioned drawbacks by establishing a conference between at least three communicating entities over a packet network by assigning one communicating entity to an already-established communication between at least two other communicating entities such that the assigned communicating entity may benefit from a policy of mixing flows transmitted and received by the assigned communicating entity.

In order to achieve this object, an inventive method for accessing, from a third-party communicating entity, a communication managed by a host communicating entity and established between the host communicating entity and at least one participant communicating entity via a packet network, is characterized in that it comprises the following steps:

transmitting a message from the third-party communicating entity to the host communicating entity, the message comprising at least one parameter associated with an identifier of a participant communicating entity, and applying a restrictive policy on mixing communication flows exchanged between the participant communicating entity whose identifier is associated with the parameter and the third-party communicating identity, said policy being determined by the parameter and the identifier associated with the parameter.

Advantageously, the message provides an indication to the first communicating entity managing the communication flows in order to select the flows exchanged between the communicating entities. The restrictive mixing policy enables the third-party communicating entity to partially join the already-existing communication so that the third-party communicating entity receives only some of the flows transmitted by the other communicating entities and/or so that certain communicating entities do not receive flows transmitted by the third-party communicating entity.

According to one feature of the invention, the parameter associated with the participant communicating entity's identifier may correspond to a restrictive mixing policy on communication flows, whereby no communication flows transmitted by the participant communicating entity are received by the third-party communicating entity.

According to another feature of the invention, the parameter associated with the participant communicating entity's identifier may correspond to a restrictive policy on mixing communication flows, whereby no communication flows transmitted by the third-party communicating entity are received by the participant communicating entity.

According to another feature of the invention, the parameter associated with the participant communicating entity's identifier may correspond to a restrictive policy on mixing communication flows, whereby no communication flows transmitted by the participant communicating entity are received by the third-party communicating entity and no communication flows transmitted by the third-party communicating entity are received by the participant communicating entity.

According to another feature of the invention, the communication flows exchanged during the conference may comply with the SIP protocol.

According to other features of the invention, the message may be an "INVITE" message in accordance with the SIP protocol; and the parameter may be included within a "Join" header within said message.

According to another feature of the invention, the participant communicating entity whose identifier is associated with said parameter may be the host communicating entity. The restrictive policy may be used in this situation for exchanges of flows between the entity that wishes to access the communication and the host entity managing the communication.

The invention also concerns a third-party communicating entity intended to access a communication managed by a host communicating entity and established between the host communicating entity and at least one participant communicating entity via a packet network, characterized in that it comprises means for transmitting a message to the host communicating entity, the message comprising at least one parameter associated with the identifier of a participant communicating entity, and said parameter and the identifier associated with the parameter determining a restrictive policy on mixing communication flows exchanged between the participant communicating entity whose identifier is associated with the parameter and the third-party communicating entity, said policy being applied by the host communicating entity. The communicating entity which transmits this message includes a software module which is a client user agent, in SIP terminology.

The invention also concerns a host communicating entity in communication with at least one participant communicating entity and intended to manage an access to said communication from a third-party communicating entity via a packet network, characterized in that it comprises means for receiving a message transmitted by the third-party communicating entity, the message comprising at least one parameter associated with an identifier of the participant communicating entity, and means for applying a restrictive policy on mixing communication flows exchanged between the participant communicating entity whose identifier is associated with the parameter and the third-party communicating entity, said policy being determined by the parameter and the identifier associated with the parameter. The communicating entity which transmits this message includes a software module which is a server user agent, in SIP terminology.

The client and server user agents are respectively included among communicating entities of the inventive communication system.

The communicating entity for managing access to a communication and the communicating entity that wishes to access a communication may each be included within a media server or within a terminal.

The invention also pertains to a system for managing access to a communication established between a host communicating entity and at least one participant communicating entity from a third-party communicating entity via a packet network, characterized in that it comprises means for transmitting a message from the third-party communicating entity to the host communicating entity, the message comprising at least one parameter associated with an identifier of a participant communicating entity, and means for applying a restrictive policy on mixing communication flows exchanged between the participant communicating entity whose identifier is associated with the parameter and the third-party communicating entity, said policy being determined by the parameter and the identifier associated with the parameter.

Figure 2:
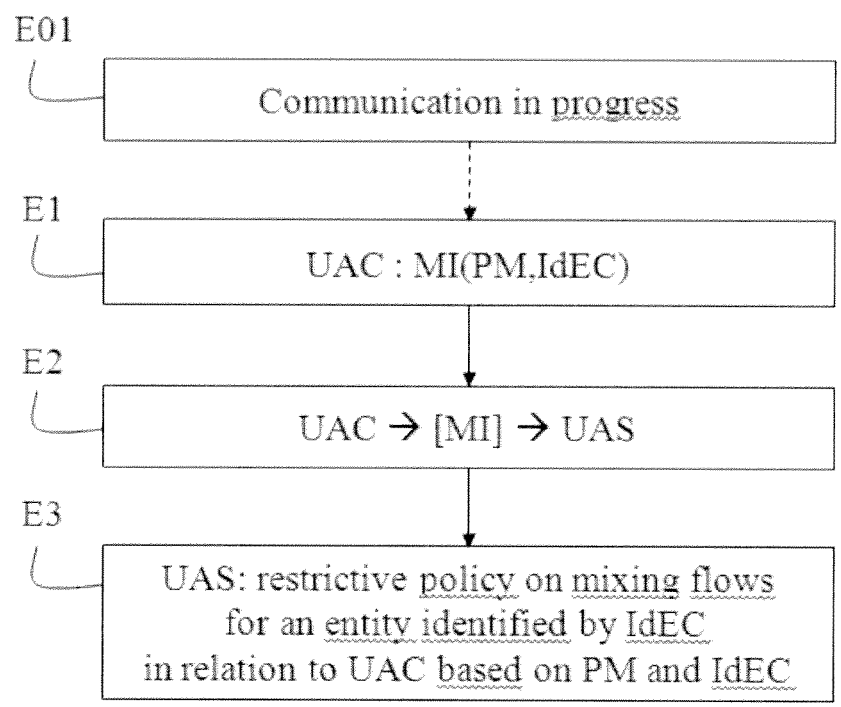

The present invention and the advantages thereof shall be better understood upon examining the description below, which makes reference to the attached figures, in which:

FIG. 1 is a schematic block diagram of a communication system for establishing a multimedia conference between at least three communicating entities over a packet network according to the invention; and FIG. 2 is an algorithm of a method for establishing a multimedia conference between at least three communicating entities over a packet network according to the invention.

With reference to FIG. 1, a communication system according to the invention comprises a packet network RP and at least three communicating entities capable of communicating with one another, of which two communicating entities are capable of establishing communication between themselves and a third-party communicating entity is capable of joining the communication. A communicating entity may be constituted by or included within a terminal or a server.

Generally speaking, the term "communication" refers to a two-way communication, meaning a dialogue between two communicating entities, or a conference in which at least three communicating entities participate. A third-party communicating entity may join an already-existing communication between n participant communicating entities with ≥2, of which one host communicating entity is managing said communication.

In order to join the communication, the third-party communicating entity transmits an invite message MI to the host communicating entity, with this message containing at least one mixing parameter PM associated with at least one of the participant entities. Each mixing parameter PM may be associated with a list of participant communicating entities, and indicates that each participant communicating entity associated with the mixing parameter must not receive data from the third-party communicating entity and/or must not transmit data to the third-party communicating entity. The participant communicating entity associated with the mixing parameter may be the some as the host communicating entity that received the invite message.

In one embodiment of the invention, the invite message MI is an INVITE message and the mixing parameter PM is included within a "Join" header field of the INVITE message according to the standard defined in the document RFC 3911. According to another embodiment, the invite message MI is an INVITE message and the mixing parameter is included within the "Join" header field of the INVITE message.

The "Join" header contains information about a SIP communication ("dialog" in SIP terminology) already established between the host communicating entity and a participant communicating entity, the information containing, for example, a "dialog" identifier associated with a field called "call-id", an identifier of the host communicating entity associated with a field called "to-tag" and an identifier of the participant communicating entity associated with a field called "from-tag". The "from-tag" identifier designates the entity that requested a "dialog" and the "to-tag" identifier designates the entity that accepted an invite to a "dialog".

In FIG. 1, two communicating entities given as examples are a first terminal TC1 and a second terminal TC2 capable of communicating with one another, and the third-party communicating entity is a third terminal TC3 capable of communicating with the first and second terminals. Optionally, a communication system further comprises a proxy server SP, an application server SA, and a media server SM. The proxy server SP, application server SA, and media servers SM are included in the packet network RP.

The packet network RP is, for example, an IP ("Internet Protocol") high-speed network such as the Internet or an intranet, or even a company-specific private network. For example, each of the terminals TC1, TC2, and TC3 may be a personal computer or an intelligent terminal that may communicate with the packet network via a wired or wireless connection.

It is assumed that the first and second terminals TC1 and TC2 are capable of communicating with one another over the packet network RP in a communication compliant with the SIP protocol. For example, the communication between the terminals corresponds to an exchange of multimedia flows regarding audio and/or video content, or instant messages.

In one example, the users of the first, second, and third terminals are respectively a salesman, a client, and a salesman's assistant. First, the salesman wishes that a communication be established with the client, then second, that the salesman's assistant join the communication with a restrictive policy on mixing multimedia flows. This policy allows, for example, the assistant to listen to the communication without the client receiving any multimedia flows coming from the assistant.

First, the first terminal TC1 establishes a communication with the second terminal TC2 by means of the proxy server SP. When turned on, each terminal TC1, TC2 is recorded with the proxy server SP, which assigns an address, such as a URI ("Uniform Resource Identifier") to the terminal. The URI address enables the terminal to be identified within the packet network RP. The first terminal transmits a SIP message to the proxy server, which may route this SIP message to the second terminal in order to establish a "dialog" communication between the first and second terminals. For this purpose, the proxy server correlates, for example, the content of the SIP message received with the URI address of the second terminal.

The proxy server SP may have the functionality of listing "dialogs" established within the packet network. For example, whenever a "dialog" is established between the first and second terminals, the proxy server saves information about the "dialog", such as a "call-id" field filled in with an identifier of the "dialog", a "from-tag" field filled in with an identifier of the first terminal, a "to-tag" field filled in with an identifier of the second terminal, and a "Contact" field equipped with a parameter which indicates whether a conference is taking place and which identifies the entity hosting the conference. In particular, a communicating entity that wishes to join a conference in progress may, for example, retrieve from the proxy server the address of the communicating entity hosting the conference in progress.

In one variant, one of the first and second terminals participating in the "dialog" may have the functionality of listing the "dialogs" which it has established with third parties.

In another variant, the find terminal TC1 establishes a communication with the second terminal TC2 without the intermediary of the proxy server SP, if the first terminal possesses the URI address of the second terminal. For example, in an internal private corporate network, each terminal may know the URI address of the other terminals.

Second, the third terminal TC3 transmits an invite message MI to the terminal TC1 so that the first terminal TC1 will create a conference between the three terminals TC1, TC2, and TC3 with a restrictive policy on mixing the multimedia flows that is defined within the message MI, according to the inventive method described below. In particular, the invite message contains mixing parameters PM regarding the communication established by the terminal TC1 and indicating the permitted exchanges of flows. The terminal TC1 that received the invite message mixes the exchanges of flows with the second and third terminals and determines the status of each flow with respect to the terminal TC3 that transmitted the invite message.

In another example involving other entities depicted in FIG. 1, the application server SA implements a control logic which conducts the operations of the media server SM. For example, the application server is listening to communications established between the terminals over the packet network and orders the media server so that this media server will interact with at least one of said terminals.

The media server SM delivers multimedia flows to terminals. In particular, the media server may act as a bridge for a multimedia conference between multiple terminals.

The servers SM and SA may be included within the same server. For example, the servers SM and SA may be included within a monitoring server which monitors communications between terminals and which retranscribes certain data exchanged between these terminals. This monitoring server detects all communication established between two specific terminals designated by URI addresses known to the monitoring server, and saves all of the audio data flows exchanged between the two terminals. In this situation, the monitoring server plays the role of the communicating entity carrying out the mixing policy. As in the previous case, a third terminal TC3 that wishes to access the communication hosted within the monitoring server between at least the terminals TC1 and TC2 sends an invite message MI containing a mixing parameter PM to the monitoring server.

According to the invention, the invite message MI is transmitted from a client user agent UAC to a server user agent UAS and includes at least one mixing parameter PM. The client user agent UAC is included within a third-party communicating entity that wishes to access a communication that already exists between participant communicating entities, and the server user agent UAS is included within a host communicating entity among the participant communicating entities, which manages said already-existing communication. A mixing parameter is, for example, one of the parameters "recvonly", "sendonly" and "inactive".

Generally speaking, the server user agent UAS is included within a communicating entity which may be a terminal or a server that is a media server and which is in two-way "dialog" communication or in a conference with terminals. Furthermore, the client user agent UAC is included within a communicating entity which may be a terminal or a server, for example a media server, and which is intended to join an existing "dialog" or an existing conference between terminals and potentially at least one server.

According to the example depicted in FIG. 1, the client user agent UAC is included within the third terminal TC3 and the server user agent UAS is included within the first terminal TC1.

According to the invention, the client user agent UAC may send an invite message MI to the server user agent UAS in order to join a "dialog" whose exchanges of multimedia flows are mixed by the server user agent UAS. The client user agent UAC may associate one or more communicating entity identifiers with each mixing parameter PM within the invite message MI. Preferentially, a single communicating entity identifier is not associated with multiple mixing parameters PM. Furthermore, the client user agent UAC may associate a mixing parameter PM with an identifier of a communicating entity which is not participating in the "dialog" identified within the invite message MI, but which is participating in the conference.

The server user agent UAS receives an invite message MI and adopts a restrictive policy on mixing multimedia flows as a function of the mixing parameter(s) included within the message MI. More particularly, said restrictive policy is determined by each mixing parameter included within the message MI and each communicating entity identifier associated with the parameter. In other terms, a parameter may be said to be "filled in with" or "have as its value" a communicating entity identifier.

A restrictive policy on mixing multimedia flows is different from a conventional policy on mixing multimedia flows in that it restricts exchanges of flows between the third-party communicating entity that joined an already-existing communication between participant communicating entities and one or more participant communicating entities. The third-party communicating entity does not receive flows from at least one participant communicating entity and/or in that at least one participant communicating entity does not receive flows from the third-party communicating entity.

If the message MI contains a "recvonly" parameter associated with an identifier of a participant communicating entity, the server user agent UAS executes a mixing policy such that the multimedia flows transmitted to the participant communicating entity ignore the flows generated by the client user agent UAC. Consequently, no flows coming from the client user agent UAC are transmitted to the participant communicating entity which is associated with the "recvonly" parameter within the message MI.

If the message MI contains a "sendonly" parameter associated with an identifier of a participant communicating entity, the server user agent UAS executes a mixing policy such that the multimedia flows transmitted by the participant communicating entity are not received by the client user agent UAC. Consequently, the client user agent UAC does not receive any flows from the participant communicating entity which is associated with the "sendonly" parameter within the message MI.

If the message MI contains an "inactive" parameter associated with an identifier of a participant communicating entity, the server user agent UAS executes a mixing policy such that the multimedia flows transmitted to the participant communicating entity ignore the flows generated by the client user agent UAC and the multimedia flows transmitted by the participant communicating entity are not received by the client user agent UAC. Consequently, the client agent UAC does not exchange any flows with the participant communicating entity which is associated with the "inactive" parameter within the message MI.

The denominations "recvonly", "sendonly" and "inactive" defining the types of mixing parameters MP are given as nonlimiting examples for a policy on mixing flows exchanged between the third-party communicating entity including the client user agent UAC and a participant communicating entity associated with a mixing parameter, from the viewpoint of the client user agent UAC.

Restrictions may be applied to the mixing policy in order to prevent undesired events, such as a disclosure of confidential data. For example, a SIP option tag may be included within the invite message MI and interpreted by a server user agent UAS which does not implement the invention so that this server user agent UAS can reject the message in order to execute a conventional mixing of flows as defined by the document RFC 3911, ignoring the mixing parameter(s) PM included within the message MI.

According to the invention, the server user agent UAS, which receives the invite message MI, may still decline the invite transmitted by the server user agent UAC.

Generally speaking, the invite message MI is a method which uses the SIP protocol and which correlates information regarding at least one "dialog" already established between participant communicating entities. This information is used by the server user agent UAS in order to determine the context of the identified "dialog", so as to consider all of the participant communicating entities which are in communication with the communicating entity that includes the agent UAS. Each participant communicating entity identifier associated with a mixing parameter PM within the message MI thus enables the agent UAS to identify the communicating entity to which a restrictive policy on mixing flows is to be applied.

According to one embodiment of the invention, the message MI is an INVITE message containing a "Join" header in accordance with the standard defined in the document RFC 3911. In such a case, the information regarding at least one "dialog" already established between two communicating entities is included in the "Join" header.

With reference to FIG. 2, the method for establishing the conference according to one embodiment of the invention comprises steps E1 to E3 executed automatically within the inventive communication system.

During a preliminary step E01, a communication is established in which a set of participant communicating entities participate, comprising at least two participant communicating entities. It is assumed that a host communicating entity among the participant communicating entities manages the communication, which may be a simple dialog between two entities or a conference between at least three entities.

For example, the communication is established by a server user agent UAS included within a first terminal TC1 with a second terminal TC2.

According to another example, first, second, and third terminals TC1. TC2, and TC3 are in a conference by means of a media server SM which mixes the multimedia flows exchanged between the three terminals.

During step E1, a client user agent UAC included within a third-party communicating entity generates an invite message MI intended to be transmitted to the server user agent UAS included within the host communicating entity managing the communication established during the preliminary step E01, for example the first terminal TC1. The invite message MI is a request which may be interpreted and accepted by the server user agent UAS in order for the third-party communicate entity to be able to participate in a multimedia conference hosted by the host entity that includes the server user agent UAS.

The invite message MI contains at least one mixing parameter PM associated with at least one identifier IdEC of a communicating entity participating in the multimedia communication. Each mixing parameter PM indicates to the server user agent UAS the policy on mixing the flows which is to be applied to the participant communicating entity whose identifier IdEC is associated with the parameter PM.

The invite message MI contains a single mixing parameter PM of each type "recvonly", "sendonly" or "inactive", which may be associated with a single identifier of a participant communicating entity or with multiple identifiers of participant communicating entities, meaning multiple distinct participant communicating entities.

In one variant, the invite message MI may contain multiple mixing parameters MP of the same type, "recvonly", "sendonly" or "inactive", which are respectively associated with multiple IdEC identifiers of a participant communicating entity, meaning multiple distinct participant communicating entities.

For example, the client user agent UAC connected to a proxy server to obtain information on the already-established communication, particularly including an identifier of a "dialog" used within that communication and an identifier of the communicating entity which is participating in that communication and to which the policy on mixing flows is to be applied.

During step E2, the client user agent UAC included within the third-party communicating entity transmits the generated invite message MI to the server user agent IAS included within the host communicating entity that is managing the communication.

For example, the invite message MI is transmitted from the client user agent UAC to the server user agent UAS via a proxy server.

During step E3, the server user agent UAS receives and analyzes the invite message MI transmitted by the client user agent UAC.

If the information on the multimedia communication in progress contained within the invite message MI is valid, the server user agent UAS accepts the third-party communicating entity that includes the client user agent UAC within the multimedia communication.

If the communication is initially a two-way communication, then the acceptance by the third-party communicating entity creates a conference between three entities. If the communication is initially a conference, then the acceptance by the third-party communicating entity corresponds to adding a participant to the conference.

In particular, the server user agent UAS identifies each participant communicating entity whose identifier is associated with a parameter PM and applies each identified communicating entity a restrictive policy on mixing the communication flows exchanged between the third-party communicating entity which includes the client user agent UAC and the communicating entity identified based on the identifier IdEC associated with the parameter PM. The parameter PM "recvonly", "sendonly" or "inactive" and a participant communicating entity identifier associated with the parameter determine said restrictive policy.

According to a first example, a first terminal serves as a bridge to a multimedia conference in which a set of participant communicating entities participate, comprising the first terminal, a second terminal, and a third terminal. The first, second, and their terminals are respectively used by "Alice", "Bob", and "Charles". It is assumed that the terminal used by "Alice" is a host communicating entity managing the conference.

A first "dialog" is initially established between "Alice" and "Bob" and a proxy server saves information about the first "dialog", this information being a "call-id" associated with an identifier of the first "dialog" filled in with "A-B@B", a "to-tag" field associated with an identifier of the first terminal filled in with "1234467", and a "from-tag" field associated with an identifier of the second terminal filled in with "AB23". A second "dialog" is then established between "Alice" and "Charles", and a proxy server saves information regarding the second "dialog", this information being a "call-id" associated with an identifier of the second "dialog" filled in with "A-C@C", a "to-tag" field associated with another identifier of the first terminal filled in with "RT45" and a "from-tag" field associated with an identifier of the third terminal filled in with "U166".

A third-party communicating entity is the fourth terminal used by "Daniel". who wishes to join the conference. The third-party communicating entity generates an invite message containing a "recvonly" parameter associated with "Charles" in order to restrict the policy on mixing flows exchanged between the fourth terminal used by "Daniel" and the third terminal used by "Charles" such that "Daniel" may receive all flows transmitted by "Charles" without "Charles" receiving any flows transmitted by "Daniel".

The invite message transmitted by the third-party communicating entity used by "Daniel" to the host communicating entity hosting the conference and used by "Alice" has the following format:

"INVITE Alice
From: Daniel
To: Alice
call-id: jjjjjd234@D
Join: A-B@B; to-tag=1234467; from-tag=AB23; recvonly=UI66".

If the host communicating entities buying "Alice" can no longer ensure the hosting of the multimedia conference due to a high number of participants, that entity may retrieve the address of a media server and transmit that address to the third-party communicating entity, as well as to the other entities participating in the conference. The media server, to which each entity participating in the aforementioned conference may connect, ensures the hosting of the multimedia conference in progress. The third-party communicating entity may then transmit a new invite message to the media server so that the media server may apply a restrictive policy on mixing flows.

According to a second example, two communicating entities which are respectively a first terminal and a second terminal are in communication. The first and second terminals are respectively used by "Alice" and "Bob". It is assumed that the terminal used by "Alice" is a host communicating entity managing the conference.

A proxy server saves information about the "dialog" established between "Alice" and "Bob", this information being a "call-id" field associated with a "dialog" identifier filled in with "A-B@B", a "to-tag" field associated with an identifier of the first terminal filled in with "12345", and a "from-tag" field associated with an identifier of the second terminal, filled in with "54321".

A third terminal used by "Charles" queries the proxy server in order to route a simple call to the first terminal, as "Charles" is unaware of the conference between "Alice" and "Bob". An application server which is listening to communications within the packet network intercepts "Charles" call, and orders a third-party communicating entity constituted by a media server so that this entity will generate and transmit an invite message to the host communicating entity used by "Alice".

The third-party communicating entity generates the invite message containing an "inactive" parameter associated with "Bob" in order to restrict the policy on mixing flows exchanged between the third-party communicating entity constituted by the media server and a second terminal used by "Bob", such that "Alice" can communicate with the media server without "Bob" being able to exchange multimedia flows with the media server. For example, the media server sends "Alice" a flow containing the question "Charles is calling you, press '1' to accept the call" without "Bob" hearing the question.

The invite message automatically transmitted by the third-party communicating entity constituted by the media server to the host communicating entity used by <<Alice" has the following format:

"INVITE Alice
From: media server
To: Alice
call-id: 15423@SM
Join: A-B@B; to-tag=12345; from-tag=54321; inactive=54321".

According to a third example, two communicating entities which are respectively a first terminal and a second terminal are in communication. The first and second terminals are respectively used by "Alice" and "Bob". It is assumed that the terminal used by "Alice" is a host communicating entity managing the conference.

A proxy server saves information about the "dialog" established between "Alice" and "Bob", this information being a "call-id" field associated with a "dialog" identifier filled in with "A-B@B", a "to-tag" field associated with an identifier of the first terminal filled in with "12345", and a "from-tag" field associated with an identifier of the second terminal, filled in with "54321".

A monitoring server is listening to communications within the packet network. Once the "dialog" is established between "Alice" and "Bob", the monitoring server is notified of this, for example by means of the proxy server that saved the information regarding the "dialog", and generates an invite message containing a "recvonly" parameter associated with "Alice" and with "Bob" in order to restrict the policy on mixing flows exchanged between a third-party communicating entity constituted by the monitoring server and the first and second terminals used by "Alice" and "Bob" such that the monitoring server may receive all the flows transmitted by "Alice" and "Bob" without the two of them receiving any flows transmitted by the monitoring server. For example, the host communicating entity used by "Alice" copies the flows regarding "Alice" and "Bob", and transmits them to the additional communicating entity constituted by the monitoring server, such that the monitoring server can listen to all the conversations between "Alice" and "Bob" without the two of them receiving any flows coming from that server.

The invite message transmitted by the third-party communicating entity constituted by the monitoring server to the host communicating entity used by <<Alice" has the following format:

"INVITE Alice
From: monitoring server
To: Alice
call-id: 13254@SS
Join: A-B@B; to-tag=12345; from-tag=54321; inactive=54321".

The invention claimed is:

1. A method for accessing, from a third-party communicating entity, a communication managed by a host communicating entity and established between the host communicating entity and at least one participant communicating entity via a packet network, wherein said method comprises:
   transmitting a message from the third-party communicating entity to the host communicating entity, the message comprising at least one mixing parameter having one of a plurality of different predefined values, each different predefined value prescribing one of a plurality of different restrictive mixing policies, said mixing parameter being associated with an identifier of a participant communicating entity, wherein said third-party communicating entity does not yet have access to the communication established between the host communicating entity and the at least one participant communicating entity when said message is transmitted; and
   applying, while maintaining the communication established between the host communicating entity and the participant communicating entity, one of the plurality of different restrictive mixing policies on communication flows exchanged between the participant communicating entity whose identifier is associated with the mixing parameter and the third-party communicating identity, said applied restrictive mixing policy being determined by the value of the mixing parameter and the identifier associated with the mixing parameter.

2. The method according to claim 1, wherein at least one of the plurality of predefined values prescribes a restrictive policy on mixing communication flows, whereby no communication flows transmitted by the participant communicating entity are received by the third-party communicating entity.

3. The method according to claim 1, wherein at least one of the plurality of predefined values prescribes a restrictive policy on mixing communication flows, whereby no communication flows transmitted by the third-party communicating entity are received by the participant communicating entity.

4. The method according to claim 1, wherein at least one of the plurality of predefined values prescribes a restrictive policy on mixing communication flows, whereby no communication flows transmitted by the participant communicating entity are received by the third-party communicating entity and no communication flows transmitted by the third-party communicating entity are received by the participant communicating entity.

5. The method according to claim 1, wherein the communication flows exchanged during communication comply with the SIP protocol.

6. The method according to claim 1, wherein the message is an INVITE message compliant with the SIP protocol.

7. The method according to claim 6, wherein the mixing parameter is included within a Join header within said message.

8. The method according to claim 1, wherein the participant communicating entity whose identifier is associated with said mixing parameter is the host communicating entity.

9. A third-party communicating entity intended to access a communication managed by a host communicating entity and established between the host communicating entity and at least one participant communicating entity via a packet network, wherein said third-party communicating entity comprises:
   a client user agent operative to transmit a message to the host communicating entity, the message comprising at least one mixing parameter having one of a plurality of different predefined values, each different predefined value prescribing one of a plurality of different restrictive mixing policies, said mixing parameter being associated with an identifier of a participant communicating entity, wherein said predefined value of the mixing parameter and the identifier associated with the mixing parameter determine which one of the plurality of different restrictive mixing policies is applied to communication flows exchanged between the participant communicating entity whose identifier is associated with the mixing parameter and the third-party communicating entity, said policy being applied by the host communicating entity while maintaining the communication established between the host communicating entity and the participant communicating entity, wherein said third-party communicating entity does not yet have access to the communication established between the host communicating entity and the at least one participant communicating entity when said message is transmitted by the client user agent.

10. A host communicating entity in communication with at least one participant communicating entity and intended to manage an access to said communication from a third-party communicating entity via a packet network, wherein said host communicating entity comprises:
   a server user agent operative to receive a message transmitted by the third-party communicating entity, the message comprising at least one mixing parameter having one of a plurality of different predefined values, each different predefined value prescribing one of a plurality of different restrictive mixing policies, said mixing parameter being associated with an identifier of the participant communicating entity, wherein said host communicating entity applies, while maintaining the communication with the participant communicating entity, a restrictive policy on mixing communication flows exchanged between the participant communicating entity whose identifier is associated with the mixing parameter and the third-party communicating entity, said policy being determined by the value of the mixing parameter and the identifier associated with the mixing parameter, wherein said third-party communicating entity does not yet have access to the communication between the host communicating entity and the at least one participant communicating entity when said message is transmitted by the third-party communicating entity.

11. A system for managing access to a communication established between a host communicating entity and at least one participant communicating entity from a third-party communicating entity via a packet network, wherein said system comprises:
- a client user agent operative to transmit a message from the third-party communicating entity to the host communicating entity, the message comprising at least one mixing parameter having one of a plurality of different predefined values, each different predefined value prescribing one of a plurality of different restrictive mixing policies, said mixing parameter being associated with an identifier of a participant communicating entity, wherein said third-party communicating entity does not yet have access to the communication established between the host communicating entity and the at least one participant communicating entity when said message is transmitted by the client user agent, and
- a server user agent operative to apply, while maintaining the communication established between the host communication entity and the participant communicating entity, a restrictive policy on mixing communication flows exchanged between the participant communicating entity whose identifier is associated with the mixing parameter and the third-party communicating entity, said policy being determined by the value of the mixing parameter and the identifier associated with the mixing parameter.

* * * * *